US007407524B2

(12) United States Patent
Han et al.

(10) Patent No.: US 7,407,524 B2
(45) Date of Patent: Aug. 5, 2008

(54) CYCLONE DUST-COLLECTING APPARATUS AND A VACUUM CLEANER HAVING THE SAME

(75) Inventors: Jung-Gyun Han, Busan (KR); Jang-Keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 512 days.

(21) Appl. No.: 11/072,771

(22) Filed: Mar. 4, 2005

(65) Prior Publication Data

US 2006/0053757 A1 Mar. 16, 2006

(30) Foreign Application Priority Data

Sep. 13, 2004 (KR) ...................... 10-2004-0072887

(51) Int. Cl.
*B01D 45/12* (2006.01)

(52) U.S. Cl. .......................... 55/426; 55/429; 55/459.1; 55/DIG. 3

(58) Field of Classification Search ................... 55/426, 55/429, 459.1, DIG. 3; 15/350, 353
See application file for complete search history.

(56) References Cited

U.S. PATENT DOCUMENTS 6,562,093 B2 * 5/2003 Oh .............................. 55/337
6,589,309 B2 * 7/2003 Oh et al. ........................ 55/429

FOREIGN PATENT DOCUMENTS

| | | |
|---|---|---|
| EP | 1136028 | 9/2001 |
| EP | 1674024 | 6/2006 |
| FR | 2817137 | 5/2002 |
| GB | 2362341 | 11/2001 |
| GB | 2369290 | 5/2002 |
| GB | 2381223 | 4/2003 |
| GB | 2388561 | 11/2003 |
| JP | 103872 | 2/1950 |
| JP | 2002-172076 | 6/2002 |
| JP | 2003070698 | 3/2003 |
| JP | 2003310500 | 11/2003 |

(Continued)

OTHER PUBLICATIONS

British Combined Search and Examination Report dated Aug. 3, 2005 corresponding to British Application No. 0506111.4.

(Continued)

*Primary Examiner*—Robert A Hopkins
(74) *Attorney, Agent, or Firm*—Ohlandt, Greeley, Ruggiro & Perle, LLP.

(57) ABSTRACT

A cyclone dust-collecting apparatus and a vacuum cleaner having the same are provided. The cyclone dust-collecting apparatus including: a cyclone body having a suction part through which air is drawn in and a discharge part through which the air is discharged; a grill connected to the discharge part, for filtering the air; a dirt receptacle connected to the cyclone body, for collecting dirt separated from the air which is drawn in through the suction part; and a downstream guide part for preventing dirt collected in the dirt receptacle from being scattered, and, of the dirt included in the drawn-in air, downward guiding a dirt having at least one of a predetermined weight and a predetermined size in a spiral direction by a flux of the air to the dirt receptacle.

18 Claims, 8 Drawing Sheets

FOREIGN PATENT DOCUMENTS

| | | |
|---|---|---|
| JP | 2004-105364 | 4/2004 |
| KR | 1020020060493 | 7/2002 |
| KR | 102003-0047609 | 6/2003 |
| KR | 102003-0056777 | 7/2003 |
| WO | WO00/74548 | 12/2000 |
| WO | WO0074547 | 12/2000 |
| WO | WO01/95780 | 12/2001 |

OTHER PUBLICATIONS

Korean Official Action issued Feb. 13, 2006 in connection to corresponding Korean Patent Application No. 2004-72887 filed on Sep. 13, 2004.

Russian Office Action issued on Dec. 15, 2005 from the Russian Patent Office with respect to Russian Patent Application No. 2005109373 filed on Mar. 24, 2005.

English Translation of Russian Office Action issued on Dec. 15, 2005 from the Russian Patent Office with respect to Russian Patent Application No. 2005109373 filed on Mar. 24, 2005.

Office Action dated Apr. 3, 2007 issued from the French Patent Office with respect to French Patent Application No. 0503012.

Preliminary Search Report dated Apr. 6, 2007 issued from the German Patent Office with respect to the German Patent Application No. 102005013315.0.

Office Action dated Nov. 6, 2007 corresponding to Japanese Patent Application No. 2005-045817.

State of the Art dated Nov. 12, 2007 corresponding to Spanish Patent Application No. 200500725.

* cited by examiner

CYCLONE DUST-COLLECTING APPARATUS AND A VACUUM CLEANER HAVING THE SAME

CROSS-REFERENCE TO RELATED APPLICATIONS

This application claims the benefit of Korean Patent Application No. 2004-72887, filed on Sep. 13, 2004, in the Korean Intellectual Property Office, the disclosure of which is incorporated herein by reference in its entirety.

BACKGROUND OF THE INVENTION

1. Field of the Invention

The present invention relates to a vacuum cleaner, and more particularly, to a cyclone dust-collecting apparatus and a vacuum cleaner having the same.

2. Description of the Related Art

In general, a cyclone dust-collecting apparatus is used in a bag-less vacuum cleaner to draw in dirt-laden air, generate a whirling current in the dirt-laden air to separate the dirt from the air using a centrifugal force generated by the whirling current.

FIG. 1 is a view schematically illustrating a conventional cyclone dust-collecting apparatus applied to a vacuum cleaner.

As shown in FIG. 1, the cyclone dust-collecting apparatus 1 comprises a cyclone separator or cyclone body 10, a suction part 11 for drawing in air therethrough, a discharge part 12 for discharging dirt-removed air therethrough, a grill 13 connected to the discharge part 12, and a dirt receptacle 14 for collecting and storing dirt therein.

Operation of the cyclone dust-collecting apparatus 1 is as follows.

Dirt-laden air is drawn in from a cleaning surface by a vacuum motor (not shown) of the vacuum cleaner and guided to the cyclone body 10 through the suction part 11.

Since the suction part 11 is connected tangentially to an inner circumference of the cyclone body 10, the air guided to the cyclone body 10 whirls along the inner circumference of the cyclone body 10 in the arrow direction as shown in FIG. 2 so that dirt is centrifugally separated from the air.

The dirt centrifugally separated from the air by the whirling current is guided by the inner circumference of the cyclone body 10 and falls down to the dirt receptacle 14 via a communication space 15 disposed between the cyclone body 10 and the dirt receptacle 14 by the whirling current and gravity.

Air having the dirt removed therefrom is filtered through perforations 16 of the grill 13 connected to the discharge part 12 and discharged from the cyclone dust-collecting apparatus 1 through the discharge part 12.

The cyclone dust-collecting apparatus 1 has a circular flange 17 formed under the grill 13 to prevent the dirt collected in the dirt receptacle 14 from being scattered by the whirling current and sucked into the grill 13 through the perforations 16.

If the air drawn in through the suction part 11 includes a heavy dirt item having a predetermined weight such as a coin or a bottle cap, the heavy dirt item does not directly fall down to the dirt receptacle 14 via the communication space 15 and rotates together with the whirling current onto the flange 17. As a result, the heavy dirt item is brought into contact with the flange 17, which causes an objectionable noise.

If a dirt mass having a predetermined size such as a dust ball or a dust hair is formed while the air whirls along the inner circumference of the cyclone body 10, the dirt mass is too big to directly fall down to the dirt receptacle 14 via the communication space 15, and thus rotates together with the whirling current onto the flange 17. At this time, microscopic particulates of dust are scattered from the dirt mass when the dirt mass collides the flange 17, and go back to the whirling current along the inner circumference of the cyclone body 10. Consequently, the microscopic particulates of dust may be discharged from the cyclone dust-collecting apparatus 1 to the outside through the perforations 16 of the grill 13, which causes a deterioration of the dust-collection efficiency of the dust-collecting apparatus 1.

In order to solve the above problems, another conventional cyclone dust-collecting apparatus 1' as shown in FIG. 3 is suggested. The cyclone dust-collecting apparatus 1' has a cut-off part 19 formed in a flange 17'. This cyclone dust-collecting apparatus 1' is advantages in that the heavy dirt item or the dirt mass is collected in the dirt receptacle 14 rapidly. However, it cannot completely solve the problems of the noise and the deterioration of the dust-collection efficiency. More specifically, since the flange 17' having the cut-off part 19 has a plane structure and the heavy dirt item or the dirt mass has an inertia that continues rotating, even if it has a predetermined weight or a predetermined size, it falls down to the dirt receptacle 14 through the cut-off part 19 after jumping over the cut-off part 19 and rotating around the flange 17' one or two times. As a result, the heavy dirt item or the dirt mass is brought into contact with the flange 17' until it falls down to the dirt receptacle 14 through the cut-off part 19, which causes a noise or microscopic particulates of dust to be scattered.

SUMMARY OF THE INVENTION

The present invention has been developed in order to solve the above problems in the related art. Accordingly, an aspect of the present invention is to provide a cyclone dust-collecting apparatus capable of preventing a heavy dirt item or a dirt mass from colliding with a flange of a grill and thus collecting it in a dirt receptacle as rapidly as possible, thereby solving a noise problem and improving a dust-collection efficiency, and a vacuum cleaner having the same.

The above aspect is achieved by providing a cyclone dust-collecting apparatus comprising: a cyclone body having a suction part through which air is drawn in and a discharge part through which the air is discharged; a grill connected to the discharge part, for filtering the air; a dirt receptacle connected to the cyclone body, for collecting dirt separated from the air which is drawn in through the suction part; and a downstream guide part for preventing dirt collected in the dirt receptacle from being scattered, and, of the dirt included in the drawn-in air, downward guiding a dirt having at least one of a predetermined weight and a predetermined size in a spiral direction by a flux of the air to the dirt receptacle.

The downstream guide part may comprise a first guide member disposed under the grill and formed in a spiral shape to downward guide the dirt having the predetermined weight and/or the predetermined size.

The first guide member may comprise a flange having a cut-off part which has a first portion conforming to a flowing direction of the air and a second portion opposing to the flowing direction of the air and being higher than the first portion, and gradually and downwardly inclining as going from the second portion of the cut-off part to the first portion in the flowing direction of the air.

The first portion of the cut-off part may form an angle of approximately 60° (degrees) with respect to a tangent of the suction part connected to the cyclone body to the grill, and an angle of a flowing direction of the air between the first portion and the second portion with respect to a center of the grill may be approximately 100°.

A predetermined area of the flange adjacent to the second portion of the cut-off part may have an outer diameter that gradually increases within a range of a predetermined width, so that it is larger than the other area of the flange. The predetermined width by which the outer diameter gradually increases may be approximately 2 to 10 mm (millimeters).

The downstream guide part may further comprise a second guide member formed on the cyclone body opposite to the cut-off part to guide the dirt having predetermined weight and/or the predetermined size and colliding with the cyclone body to the cut-off part.

The second guide member may include a rib that downwardly and gradually inclines as going from a first position over the first portion of the cut-off part to a second position over the second portion in the flowing direction of the air.

The rib may protrude from the cyclone body to a height of approximately 3 to 10 mm.

The first position of the rib may be position at an angle of approximately 40° with respect to a tangent of the suction part connected to the cyclone body to the grill, and an angle of the flowing direction of the air between the first position and the second position with respect to the center of the cyclone body may be approximately 120°.

According to an embodiment of the present invention, a vacuum cleaner is provided that includes: a vacuum cleaner body having vacuum suction means installed therein; a suction brush connected to the vacuum cleaner body and movable along a cleaning surface; and a cyclone dust-collecting apparatus removably mounted in the vacuum cleaner body. The cyclone dust-collecting apparatus comprises: a cyclone body having a suction part through which air is drawn in and a discharge part through which the air is discharged; a grill connected to the discharge part for filtering the air; a dirt receptacle connected to the cyclone body for collecting dirt separated from the air drawn in through the suction part; and a downstream guide part for preventing dirt collected in the dirt receptacle from being scattered, and, of the dirt included in the drawn-in air, downward guiding a dirt having at least one of a predetermined weight and a predetermined size in a spiral direction by a flux of the air to the dirt receptacle.

The downstream guide part may comprise a first guide member disposed under the grill and formed in a spiral shape to downward guide the dirt having the predetermined weight and/or the predetermined size.

The first guide member may comprise a flange having a cut-off part having a first portion conforming to a flowing direction of the air and a second portion opposing to the flowing direction of the air and being higher than the first portion, and gradually and downward inclining as going from the second portion of the cut-off part to the first portion in the flowing direction of the air.

The first portion of the cut-off part may form an angle of approximately 60° with respect to a tangent of the suction part connected the cyclone body to the grill, and an angle of the flowing direction of the air between the first portion and the second portion with respect to a center of the grill may be approximately 100°.

A predetermined area of the flange adjacent to the second portion of the cut-off part may have an outer diameter that gradually increases within a range of a predetermined width, so that it is larger than the other part of the flange. The predetermined width by which the outer diameter gradually increases may be approximately 2 to 10 mm.

The downstream guide part may further comprise a second guide member formed on the cyclone body opposite to the cut-off part to guide the dirt having the predetermined weight and/or the predetermined size and colliding with the cyclone body into the cut-off part.

The second guide member may comprise a rib that downwardly and gradually inclines as going from a first position over the first portion of the cut-off part to a second position over the second portion in the flowing direction of the air.

The rib may protrude from the cyclone body to a height of approximately 3 to 10 mm.

The first position of the rib may be positioned at an angle of approximately 40° with respect to a tangent of the suction part connected to the cyclone body to the grill, and an angle of the flowing direction of the air between the first position and the second position with respect to a center of the cyclone body may be approximately 120°.

BRIEF DESCRIPTION OF THE DRAWING FIGURES

The above aspects and other advantages of the present invention will be more apparent by describing an embodiment of the present invention with reference to the accompanying drawing figures, in which.

In the drawing figures, it should be understood that like reference numerals refer to like features and structures.

DETAILED DESCRIPTION OF AN EXEMPLARY EMBODIMENT

Hereinafter, a cyclone dust-collecting apparatus according to an embodiment of the present invention and a vacuum cleaner having the same will now be described in greater detail with reference to the accompanying drawing figures.

Figure 1:
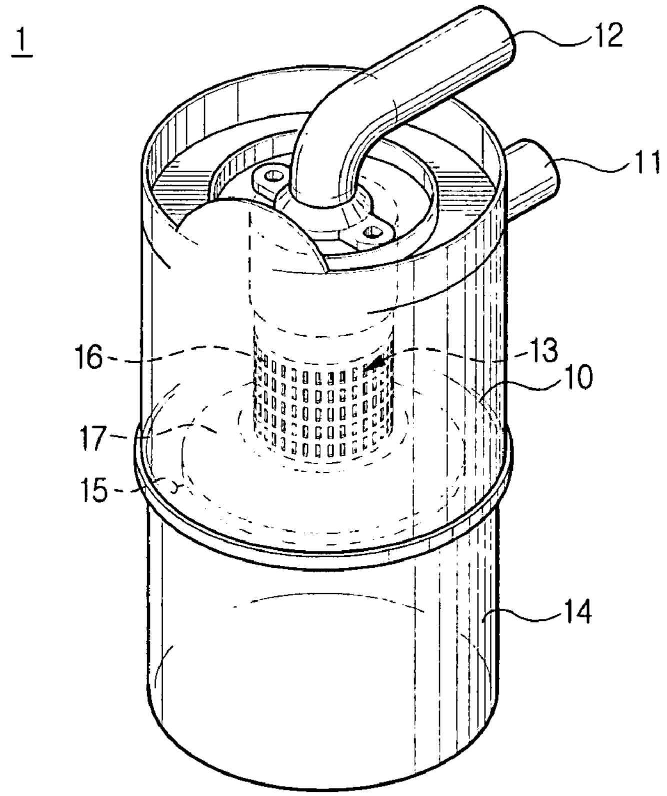
FIG. 1 (PRIOR ART)
FIG. 1 is a perspective view showing a conventional cyclone dust-collecting apparatus of a vacuum cleaner.
Figure 2:
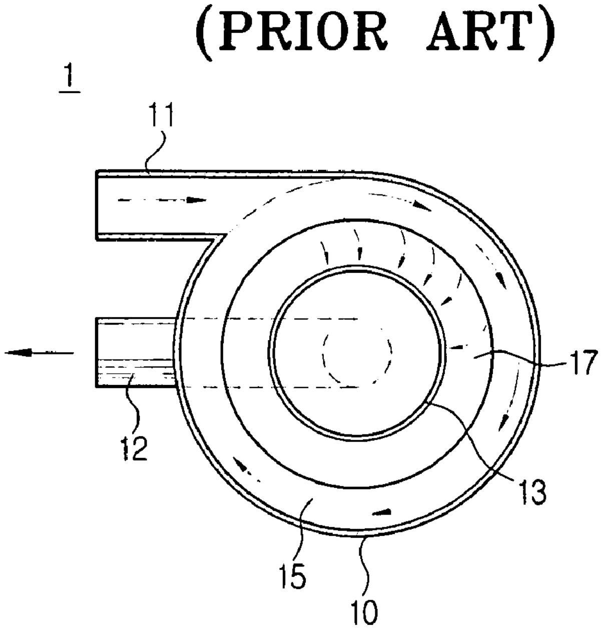
FIG. 2 (PRIOR ART)
FIG. 2 is a horizontal cross-section view showing the cyclone dust-collecting apparatus of FIG. 1.
Figure 3:
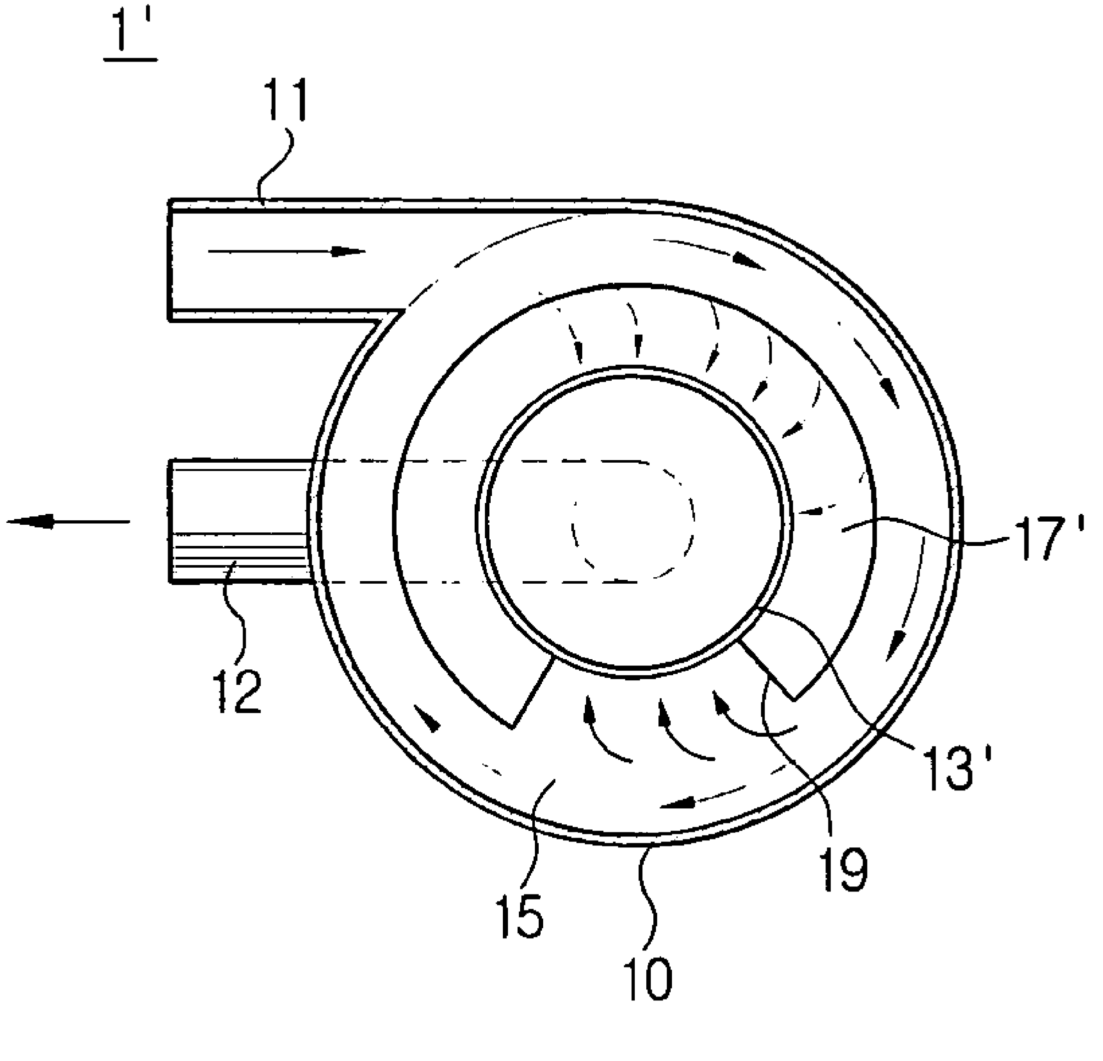
FIG. 3 (PRIOR ART)
FIG. 3 is a horizontal cross-section view showing another conventional cyclone dust-collecting apparatus of a vacuum cleaner.
Figure 4:
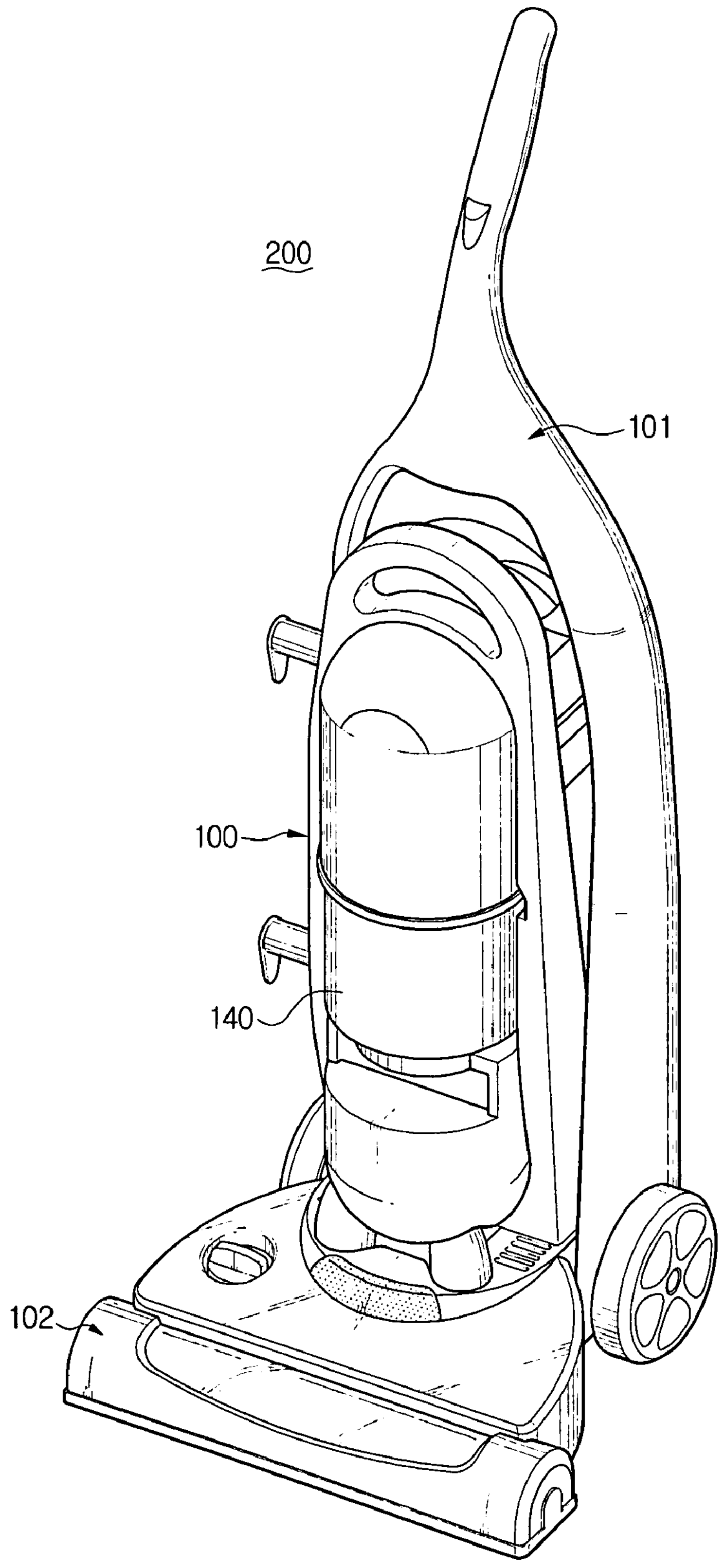
FIG. 4 is a perspective view showing an upright vacuum cleaner having a cyclone dust-collecting apparatus according to an embodiment of the present invention.

FIG. 4 is a view schematically showing an upright vacuum cleaner having a cyclone dust-collecting apparatus according to an embodiment of the present invention.

As shown in FIG. 4, an upright vacuum cleaner 200 according to the embodiment of the present invention comprises a cleaner body 101 having vacuum suction means such as a vacuum motor installed therein, a suction brush 102 for drawing in dirt-laden from a cleaning surface, and a cyclone dust-collecting apparatus 100 removably mounted in the cleaner body 101, for separating the dirt from the drawn-in air.

Since the cleaner body 101 and the suction brush 102 are the same as those of a conventional upright vacuum cleaner, detailed descriptions thereof are omitted.

Figure 5:
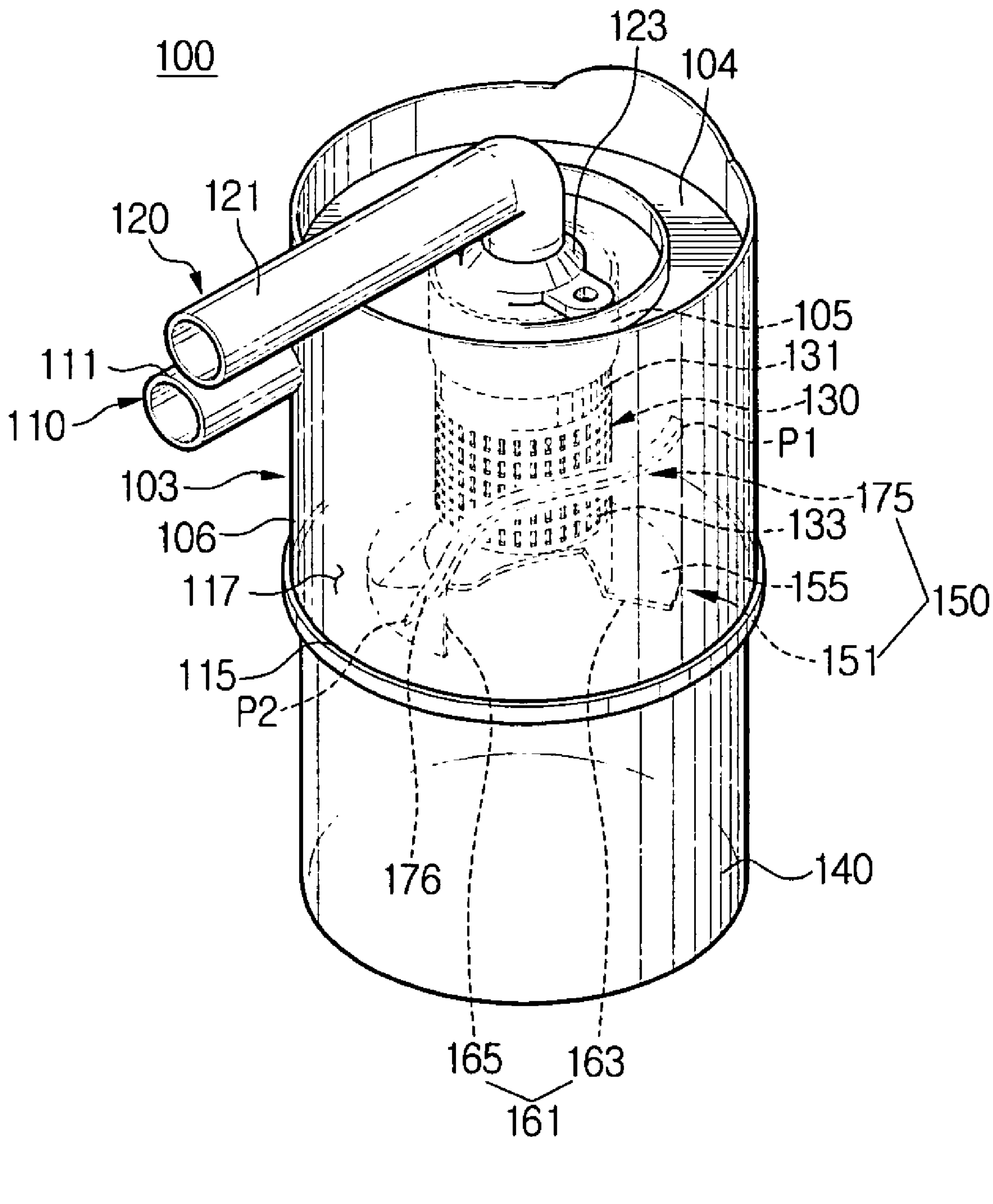
FIG. 5 is a perspective view showing the cyclone dust-collecting apparatus of FIG. 4.
Figure 6:
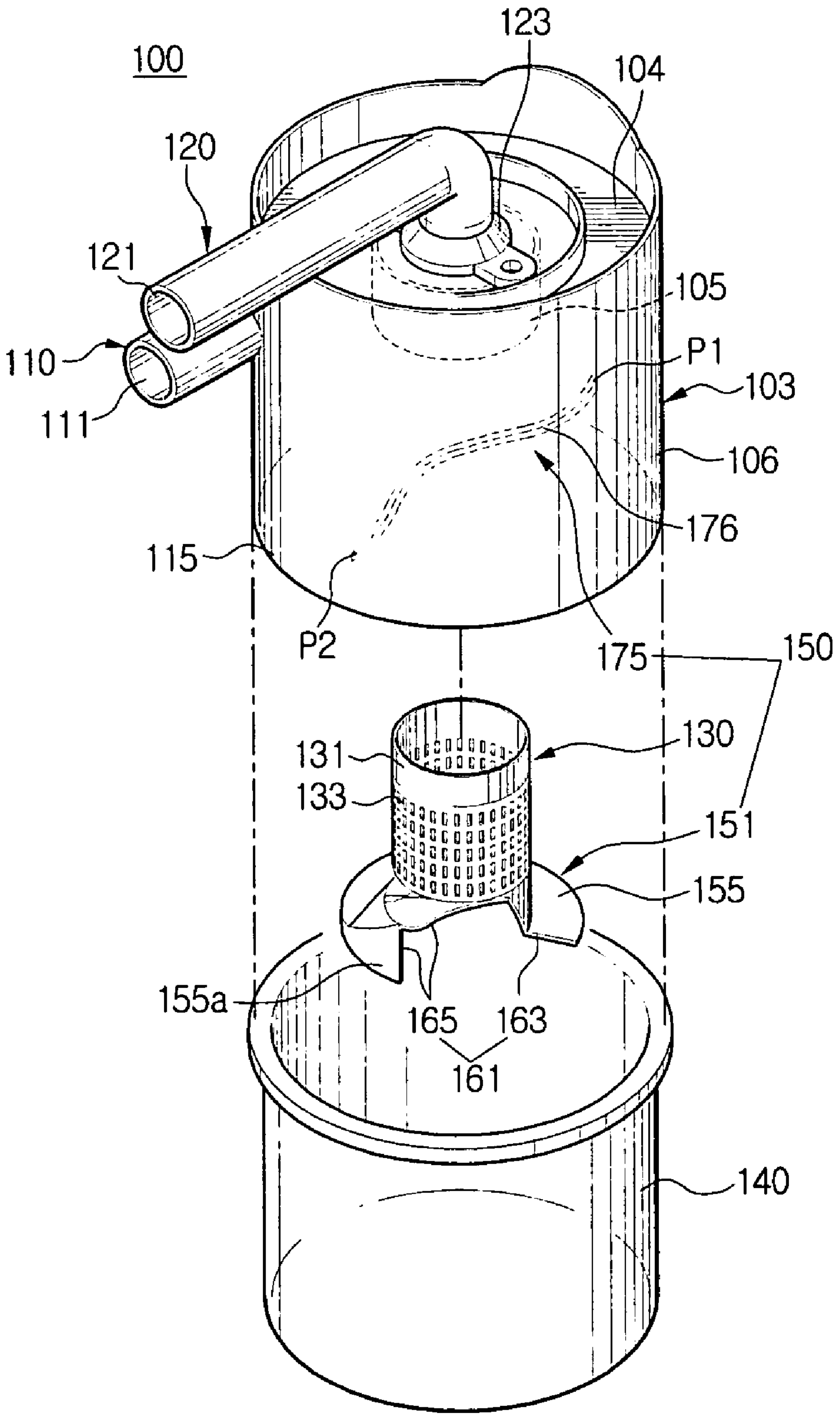
FIG. 6 is an exploded perspective view showing the cyclone dust-collecting apparatus of FIG. 5.

Referring to FIGS. 5 and 6, the cyclone dust-collecting apparatus 100 comprises a cyclone body 103, a grill 130, a dirt receptacle 140, and a downstream guide part 150.

The cyclone body 103 comprises a cylindrical trunk 106 having a dust-separating chamber, a suction part 110 through which the dirt-laden air drawn in through the suction brush 102 flows into the cylindrical trunk 106, and a discharge part 120 for discharging air which has been centrifugally separated from the dirt in the cylindrical trunk 106.

Figure 7:
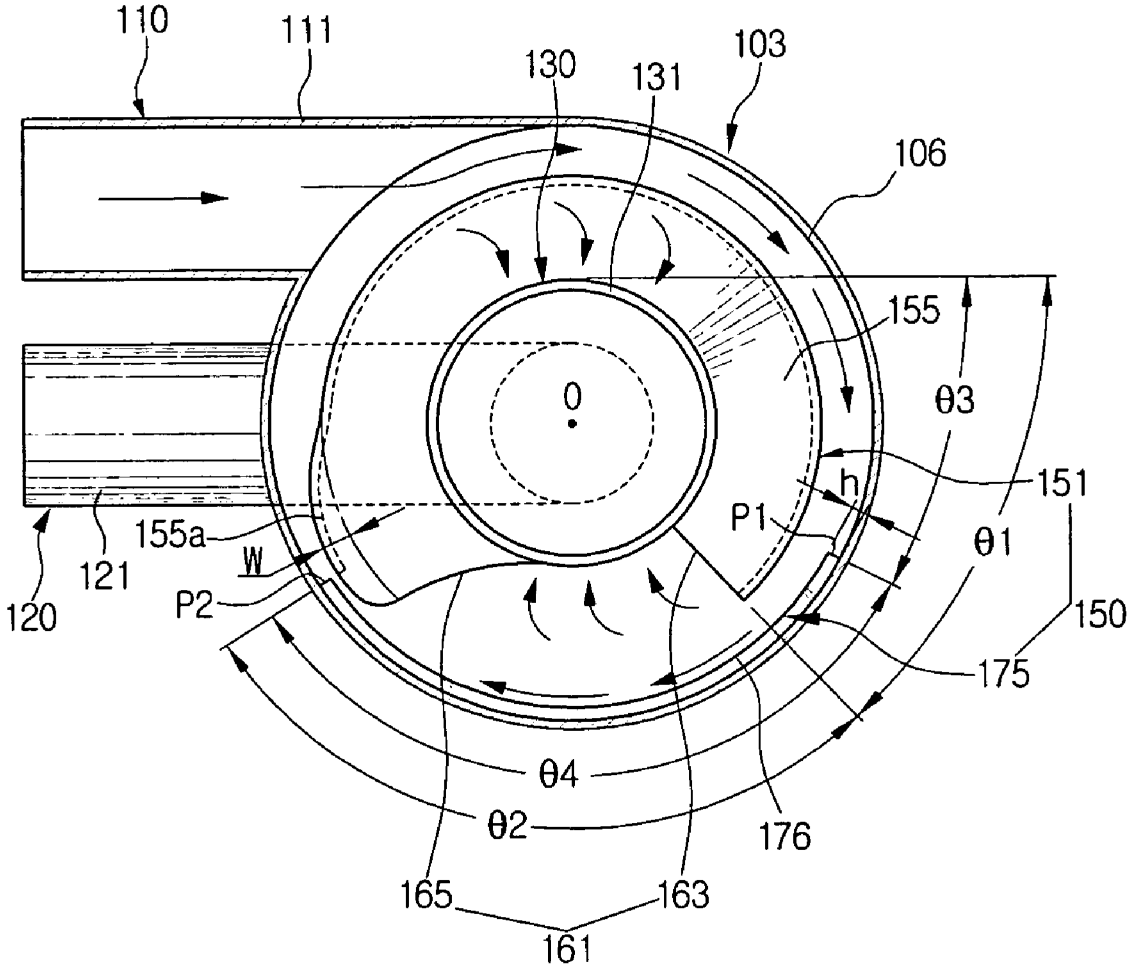
FIG. 7 is a horizontal cross-section view showing the cyclone dust-collecting apparatus of FIG. 5.

The suction part 110 has a first pipe 111 formed on a side of the cylindrical trunk 106 and connected tangentially to an inner circumference of the cylindrical trunk 106. As shown in FIG. 7, the first pipe 111 guides the drawn-in air to move along the inner circumference of the cylindrical trunk 106 in a direction as indicated by the arrows of FIG. 7, thereby forming a whirling current. Due to the whirling current, the dirt is centrifugally separated from the air.

The discharge part 120 has a second pipe 121 vertically protruding from a center portion of an upper surface 104 of the cylindrical trunk 106 and horizontally extending. The second pipe 121 is connected to the upper surface 104 of the cylindrical trunk 106 through a connection member 123.

An intermediate pipe 105 downwardly protrudes from an opposite surface to the upper surface 104 of the cylindrical trunk 106 where the second pipe 121 is disposed. The intermediate pipe 105 is connected to an upper end of a cylindrical body 131 of the grill 130, which will be described in detail below.

The grill 130 consists of the cylindrical body 131 connected to the second pipe 121 of the discharge part 120 via the intermediate pipe 105.

The cylindrical body 131 has a plurality of perforations 133 formed thereon at a predetermined interval in a predetermined pattern. The perforations 133 filters therethrough the air from which the dirt has been centrifugally separated by the whirling current along the cylindrical trunk 106, and discharges the air to the second pipe 121 through the intermediate pipe 105.

The dirt receptacle 140 is removably mounted on a lower portion 115 of the cylindrical trunk 106. The dirt receptacle 140 collects and stores dirt that has been centrifugally separated from the air by the whirling current along the inner circumference of the cylindrical trunk 106 and fallen down via a communication space 117 (see FIG. 5) formed between the cylindrical trunk 106 and the dirt receptacle 140 due to the whirling current or gravity. The dirt that is downwardly guided in a spiral direction by the downstream guide part 150 is also collected in the dirt receptacle 140.

The downstream guide part 150 has a first guide member 151 formed under the cylindrical body 131 of the grill 130 in a spiral direction. The first guide member 151 downward guides the dirt separated from the air by the whirling current to the dirt receptacle 140.

Figure 8A:
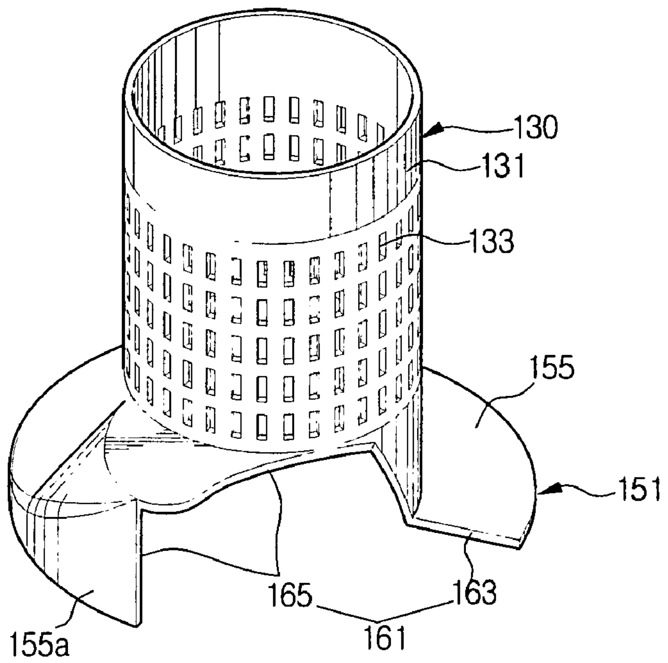
FIGS. 8A to 8C are perspective views showing a grill and a first guide member of the cyclone dust-collecting apparatus of FIG. 5.
Figure 8B:
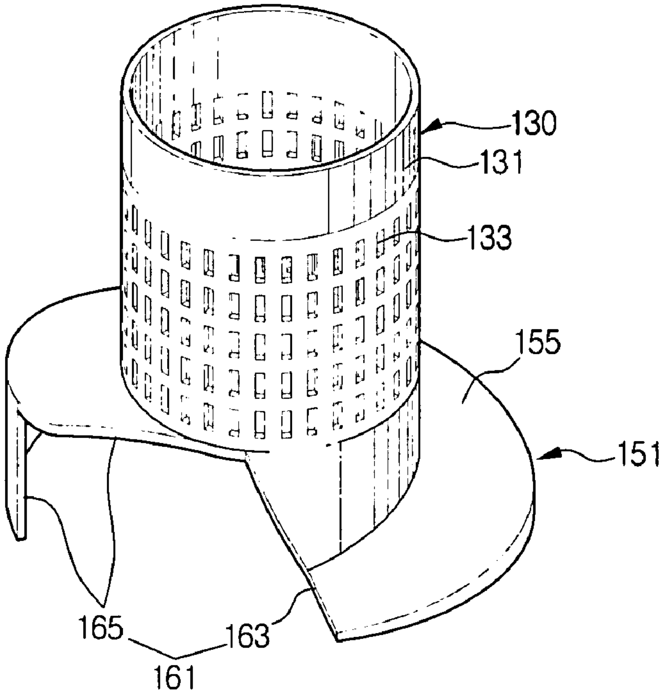
Figure 8C:
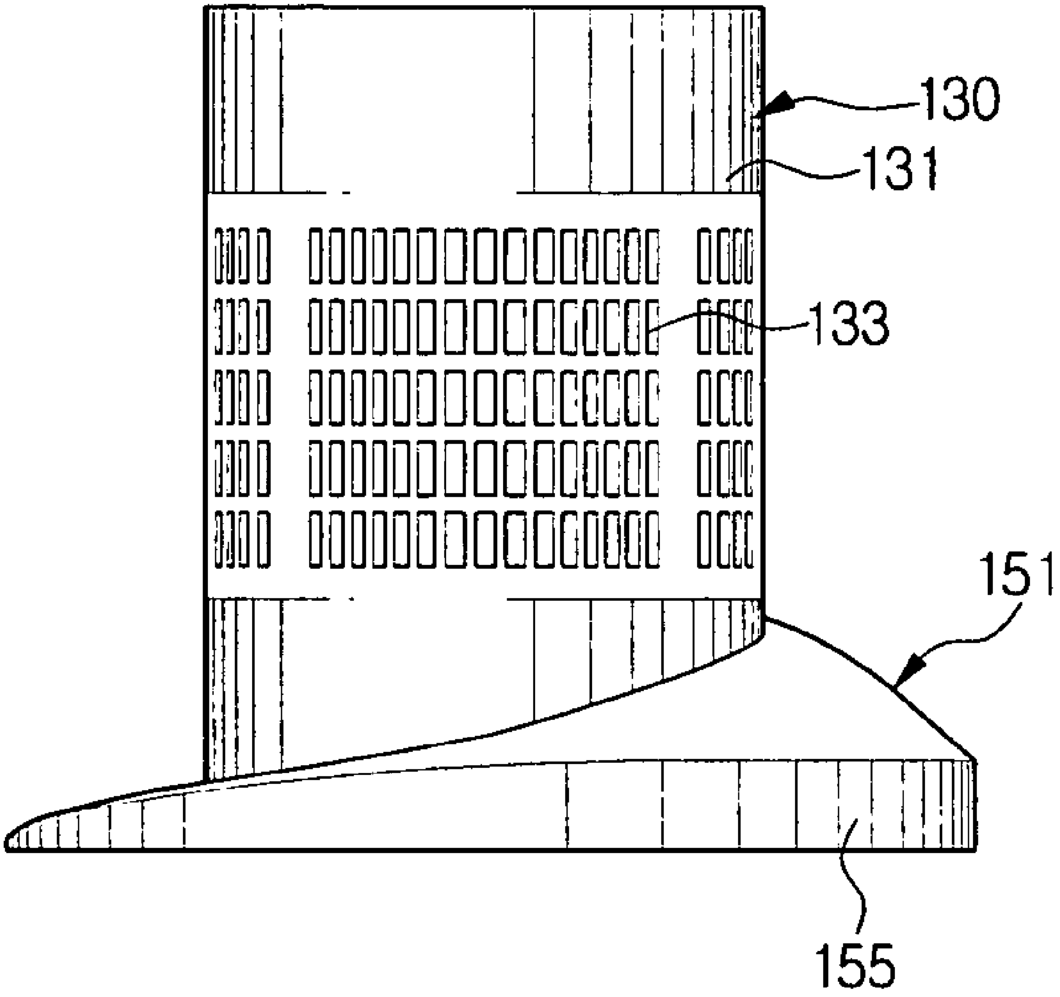

As shown in FIGS. 7 to 8C, the first guide member 151 consists of a spiral flange 155 having a cut-off part 161. The flange 155 is integrally formed with a lower and outer circumference of the cylindrical body 131.

The cut-off part 161 comprises a first portion 163 conforming to a flowing direction of the whirling current and a second portion 165 opposing to the flowing direction of the whirling current, which is higher than the first portion 163. The first portion 163 of the cut-off part 161 straightens from the cylindrical body 131 in a radial direction, while the second portion 165 is formed in the shape of '□' which is slightly tilted with respect to the radial direction.

The flange 155 is formed in a spiral shape so that it gradually and downwardly inclines as going from the second portion 165 of the cut-off part 161 to the first portion 163 in the flowing direction of the whirling current.

As shown in FIG. 7, the first portion 163 of the cut-off part 161 forms a first angle θ1 with respect to a tangent of the first pipe 111 to the cylindrical body 131, for example, approximately 60°. A second angle θ2 is formed between the first portion 163 of the cut-off part 161 and the second portion 165 with respect to a center 0 of the cylindrical body 131 of the grill 130. The second angle θ2 is approximately 100°.

A predetermined area 155*a* of the flange 155 adjacent to the second portion 165 of the cut-off part 161 has an outer diameter that gradually increases within a range of a predetermined width 'w' so that it is larger than the other area of the flange 155. The predetermined width 'w' may be approximately 2 to 10 mm.

The flange 155 having the above configuration prevents the dirt collected in the dirt receptacle 140 from being scattered by the whirling current formed along the inner circumference of the cylindrical trunk 106.

When the dirt-laden air drawn in through the first pipe 111 of the suction part 110 includes a heavy dirt having a predetermined weight such as a coin or a can lid, or when a dirt mass such as a hair ball or a thread ball is formed by the whirling current along the inner circumference of the cylindrical trunk 106 and is too big to enter into the communication space 117, the flange 155 guides the heavy dirt or the dirt mass to flow into the second portion 165 opposing to the whirling current and higher than the first portion 163 and to downward move along the spiral direction of the flange 155, so that the heavy dirt or the dirt mass is collected in the dirt receptacle 140. Accordingly, it is possible to solve the noise problem which is caused when the heavy dirt or the dirt mass is not directly collected in the dirt receptacle 140 and still remains in the whirling current along the upper surface of the flange 155 to thereby collide with the upper surface of the flange 155. Also, microscopic particulates of dust can be prevented from being scattered, and thus the dust collection efficiency is improved.

The downstream guide part 150 of the cyclone dust-collecting apparatus 100 further comprises a second guide member 175 formed on the inner circumference of the cylindrical trunk 106 opposite to the cut-off part 161.

The second guide member 175 consists of a rib 176 downwardly and gradually inclining in the flowing direction of the whirling current as going from a first position P1 that is over the first portion 163 of the cut-off part 161 to a second position P2 that is over the second portion 165.

As shown in FIG. 7, the rib 176 protrudes from the cylindrical trunk 106 to a predetermined height 'h', for example, 3 to 10 mm.

The first position P1 of the rib 176 is positioned at a third angle θ3 with respect to a tangent of the first pipe 111 to the cylindrical body 131. The third angle θ3 is approximately 40°. Also, a fourth angle θ4 is formed between the first position P1 and the second position P2 with respect to the center 0 of the cylindrical trunk 106. The fourth angle θ4 is approximately 120°.

When the heavy dirt or the dirt mass included in the air drawn in the cylindrical trunk 106 ascends again due to an abnormal turbulence and collides with the inner circumference of the cylindrical trunk 106, the rib 176 guides the heavy dirt or the dirt mass to flow into the second part 165. Accordingly, it is possible to solve the noise problem which is caused when the heavy dirt or the dirt mass is not directly collected in the dirt receptacle 140 and still remains in the whirling current along the upper surface of the flange 155 and the inner circumference of the cylindrical trunk 106 to thereby collide with the upper surface of the flange 155 and the inner circumference of the cylindrical trunk 106. Also, microscopic particulates of dust can be prevented from being scattered, and thus the dust collection efficiency is improved.

Although the cyclone dust-collecting apparatus 100 is employed in the upright vacuum cleaner as shown in FIG. 4, this should not be considered as limiting. The cyclone dust-collecting apparatus 100 can be applied to other types of vacuum cleaner.

Hereinafter, operation of the vacuum cleaner 200 having the cyclone dust-collecting apparatus 100 as described above will now be described with reference to FIGS. 4 to FIGS. 8C.

When dirt-laden air is drawn into the cleaner body 101 through the suction brush 102 from a cleaning surface by the vacuum suction means, the drawn air flows into the cyclone body 103 through the first pipe 111 of the suction part 110 connected to the suction brush 102 and whirls along the inner circumference of the cylindrical trunk 106 in the direction as indicated by the arrows of FIG. 7.

General dirt included in the drawn-in air is centrifugally separated by the whirling current and gathered along the inner circumference of the cylindrical trunk 106. The dirt falls down to the dirt receptacle 140 via the communication space 117 between the cylindrical body 106 and the dirt receptacle 140 by the whirling current and gravity.

Of dirt included in the air, a heavy dirt does not move toward the inner circumference of the cylindrical trunk 106 due to its weight and still rotates along an upper surface of the flange 155. At this time, since the second portion 165 of the cut-off part 161 formed opposite to the whirling current is higher than the first portion 163, the heavy dirt cannot jump over the second portion 165 of the cut-off part 161 even if it is applied with a rotation inertia from the whirling current, and drops down through the second part 165. As a result, the heavy dirt neither rotate along the upper surface of the flange 155 nor collide with the upper surface of the flange 155, thereby preventing the noise problem. The heavy dirt is downwardly guided in a spiral direction along a lower surface of the flange 155 and drops down to the dirt receptacle 140.

Of the dirt included in the drawn-in air, the dirt mass is formed when hair or threads are centrifugally separated by the whirling current and gathered along the inner circumference of the cylindrical trunk 106. The dirt mass generally drops down to the dirt receptacle via the communication space 117 between the cylindrical trunk 106 and the dirt receptacle 140 by the whirling current and gravity. However, when an abnormal turbulence occurs or when the dirt receptacle 140 is full of dirt, the dirt mass rotates more than usual, thereby being larger than the communication space 117. In this case, the dirt mass cannot pass through the communication space 117 and remains in the whirling current. Accordingly, since the second portion 165 of the cut-off part 161 formed opposite to the whirling current is higher than the first portion 163, the dirt mass cannot jump over the second portion 165 of the cut-off part 161 even if it is applied with a rotation inertia from the whirling current, and drops down through the second part 165. As a result, the dirt mass neither rotate along the upper surface of the flange 155 nor collide with the upper surface of the flange 155, thereby preventing its microscopic particulates of dust from being scattered. The dirt mass is downwardly guided in a spiral direction along the lower surface of the flange 155 and drops down to the dirt receptacle 140.

Also, when the heavy dirt and/or the dirt mass ascends by the abnormal turbulence and collides with the inner circumference of the cylindrical trunk 106, it is downwardly guided by the rib 176 and sucked into the second portion 165 of the cut-off part 161. As a result, since the heavy dirt and/or the dirt mass neither rotate along the upper surface of the flange 155 and the inner circumference of the cylindrical trunk 106 nor collide with the upper surface of the flange 155 and the inner circumference of the cylindrical trunk 106, the noise is prevented and microscopic particulates of dust are prevented from being scattered.

When the dirt collected in the dirt receptacle 140 through the communication space 117 between the cylindrical trunk 106 and the dirt receptacle 140 and the cut-off part 161 is again scattered and ascended by collision with new dirt centrifugally separated and dropped down or the abnormal turbulent, the dirt is blocked by the lower surface of the flange 155 and does not backflow to the cylindrical trunk 106 of the cyclone body 103.

The air from which the dirt including the heavy dirt and/or the dirt mass has been centrifugally separated is filtered by passing through the perforations 133 of the cylindrical body 131 of the grill 130 connected to the intermediate pipe 105, and discharged from the cyclone dust-collecting apparatus 100 through the second pipe 121 of the discharge part 120.

Since the cyclone dust-collecting apparatus 100 according to the present invention and the vacuum cleaner 200 having the same comprises the downstream guide part 150 for downward guiding the heavy dirt and/or the dirt mass included in the drawn-in air in the spiral direction to the dirt receptacle 140, the heavy dirt and/or the dirt mass does not collide with the flange 155 of the grill 130 and can be collected in the dirt receptacle 140 as rapidly as possible. Therefore, the noise problem in the related art can be solved and the dust-collection efficiency can be improved.

Also, the due to the presence of the downstream guide part 150, the dirt collected in the dirt-receptacle 140 can be prevented from being again scattered. Accordingly, the dust-collection efficiency can be improved.

The foregoing embodiment and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A cyclone dust-collecting apparatus comprising:

a cyclone body having a suction part through which dirt laden air is drawn in and a discharge part through which filtered air is discharged;

a grill connected to the discharge part, for filtering the dirt laden air;

a dirt receptacle connected to the cyclone body, for collecting dirt separated from the dirt laden air; and a downstream guide part for preventing dirt collected in the dirt receptacle from being scattered and for guiding a dirt item in the dirt laden air that has at least one of a predetermined weight and a predetermined size in a downward spiral direction to the dirt receptacle, wherein the downstream guide part comprises a first guide member disposed under the grill and formed in a spiral shape to downward guide the dirt item and a second guide member formed on the cyclone body opposite to the first guide member to guide the dirt item to flow into the first guide member.

2. The cyclone dust-collecting apparatus as claimed in claim 1, wherein the first guide member comprises a flange having a cut-off part which has a first portion conforming to an air flowing direction and a second portion opposing to the air flowing direction and being higher than the first portion, the flange gradually and downwardly inclining as going from the second portion to the first portion in the air flowing direction.

3. The cyclone dust-collecting apparatus as claimed in claim 2, wherein the first portion forms a first angle of approximately 60° with respect to a tangent of the suction part and a second angle between the first portion and the second portion with respect to a center of the grill of approximately 100°.

4. The cyclone dust-collecting apparatus as claimed in claim 2, further comprising a predetermined area of the flange adjacent to the second portion of the cut-off part, the predetermined area having a first outer diameter that gradually increases to a predetermined width so that the first outer diameter is larger than a second outer diameter of a remaining area of the flange.

5. The cyclone dust-collecting apparatus as claimed in claim 4, wherein the predetermined width is approximately 2 to 10 mm.

6. The cyclone dust-collecting apparatus as claimed in claim 2, wherein the second guide member is formed on the cyclone body opposite to the cut-off part to guide the dirt item to flow into the cut-off part.

7. The cyclone dust-collecting apparatus as claimed in claim 6, wherein the second guide member comprises a rib that downwardly and gradually inclines as going from a first position over the first portion of the cut-off part to a second position over the second portion in the air flowing direction.

8. The cyclone dust-collecting apparatus as claimed in claim 7, wherein the rib protrudes from the cyclone body to a height of approximately 3 to 10 mm.

9. The cyclone dust-collecting apparatus as claimed in claim 7, wherein the first position of the rib is positioned at a third angle of approximately 40° with respect to a tangent of the suction part, and a fourth angle of the air flowing direction between the first position and the second position with respect to the center of the cyclone body is approximately 120°.

10. A vacuum cleaner comprising:

- a vacuum cleaner body having a vacuum suction member installed therein;
- a suction brush connected to the vacuum cleaner body and movable along a cleaning surface; and
- a cyclone dust-collecting apparatus removably mounted in the vacuum cleaner body,
- wherein the cyclone dust-collecting apparatus comprises:
  - a cyclone body having a suction part through which dirt-laden air is drawn in and a discharge part through which filtered air is discharged;
  - a grill connected to the discharge part for filtering the dirt-laden air;
  - a dirt receptacle connected to the cyclone body for collecting dirt separated from the dirt-laden air; and

- a downstream guide part for preventing dirt collected in the dirt receptacle from being scattered and for guiding a dirt item in the dirt-laden air that has at least one of a predetermined weight and a predetermined size in a downward spiral direction to the dirt receptacle,
- wherein the downstream guide part comprises a first guide member disposed under the grill and formed in a spiral shape to downward guide the dirt item, and a second guide member formed on the cyclone body opposite to the first guide member to guide the dirt item to flow into the first guide member.

11. The vacuum cleaner as claimed in claim 10, wherein the first guide member comprises a flange having a cut-off part having a first portion conforming to an air flowing direction and a second portion opposing to the air flowing direction and being higher than the first portion, the flange gradually and downward inclining as going from the second portion to the first portion in the air flowing direction.

12. The vacuum cleaner as claimed in claim 11, wherein the first portion forms a first angle of approximately 60° with respect to a tangent of the suction part and a second angle of the air flowing direction between the first portion and the second portion with respect to a center of the grill of approximately 100°.

13. The vacuum cleaner as claimed in claim 11, further comprising a predetermined area of the flange adjacent to the second portion of the cut-off part, the predetermined area having a first outer diameter that gradually increases to a predetermined width so that the first outer diameter is larger than a second outer diameter of a remaining area of the flange.

14. The vacuum cleaner as claimed in claim 13, wherein the predetermined width is approximately 2 to 10 mm.

15. The vacuum cleaner as claimed in claim 11, wherein the second guide member is formed on the cyclone body opposite to the cut-off part to guide the dirt item to flow into the cut-off part.

16. The vacuum cleaner as claimed in claim 15, wherein the second guide member comprises a rib that downwardly and gradually inclines as going from a first position over the first portion of the cut-off part to a second position over the second portion in the air flowing direction.

17. The vacuum cleaner as claimed in claim 16, wherein the rib protrudes from the cyclone body to a height of approximately 3 to 10 mm.

18. The vacuum cleaner as claimed in claim 16, wherein the first position of the rib is positioned at a third angle of approximately 40° with respect to a tangent of the suction part, and a fourth angle of the air flowing direction between the first position and the second position with respect to a center of the cyclone body is approximately 120°.

* * * * *